March 24, 1970     J. W. McGUFFEY     3,502,142
MULTI-DIRECTIONALLY DISTRIBUTED FLOW HEAT TRANSFER PLATE UNIT
Filed April 1, 1968     2 Sheets-Sheet 1
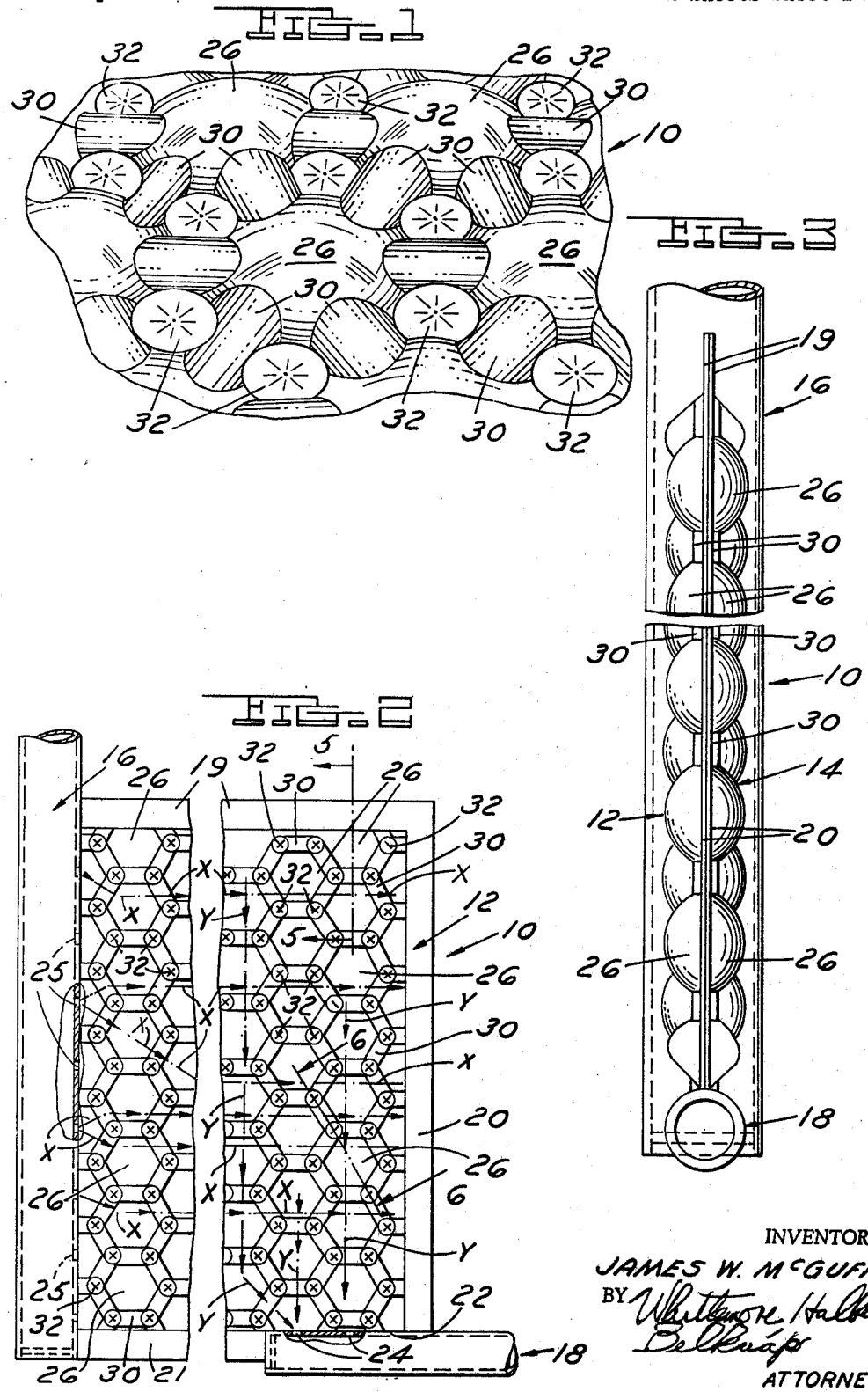
INVENTOR.
JAMES W. McGUFFEY
BY
ATTORNEYS

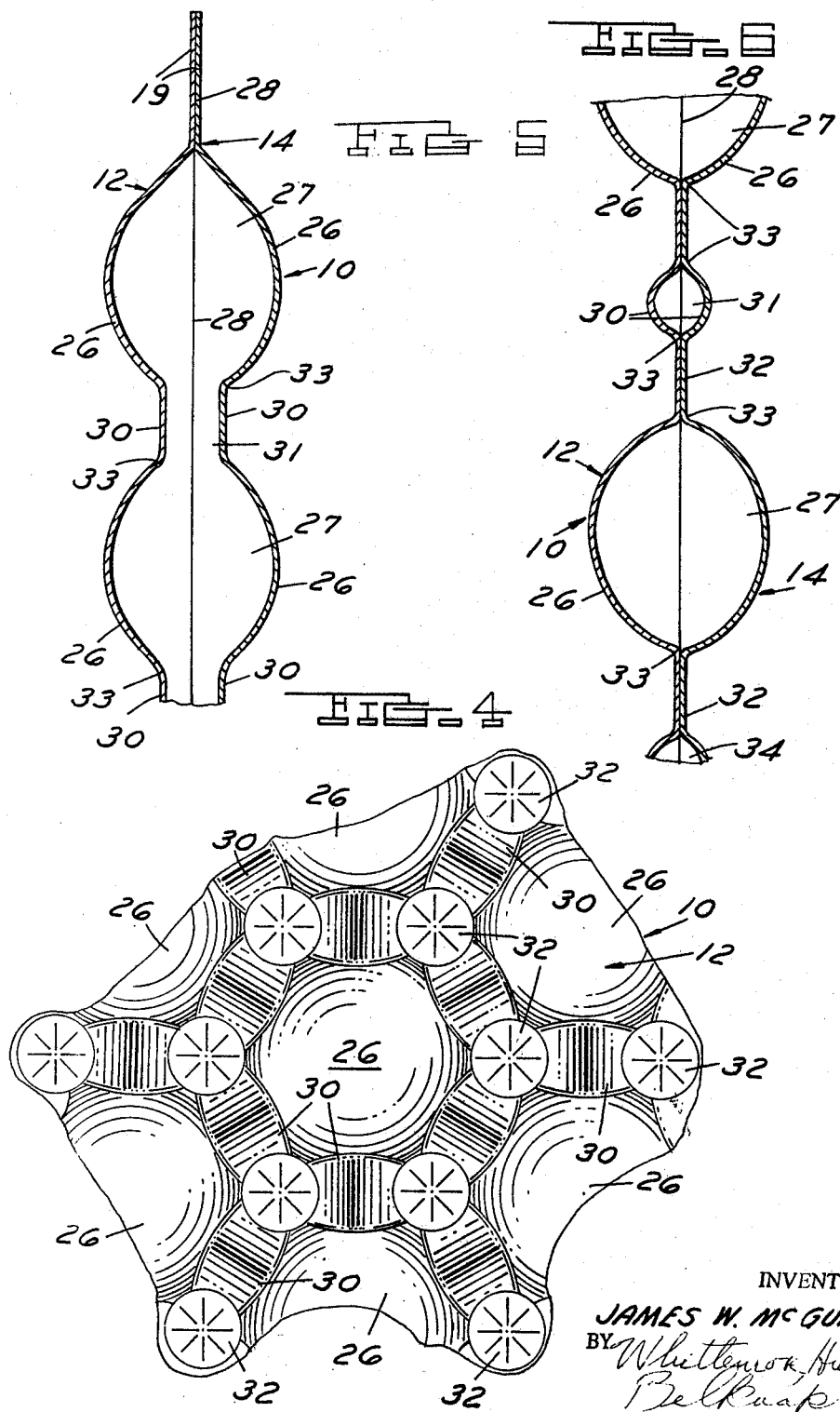

United States Patent Office 3,502,142
Patented Mar. 24, 1970

3,502,142
MULTI-DIRECTIONALLY DISTRIBUTED FLOW HEAT TRANSFER PLATE UNIT
James W. McGuffey, Lansing, Mich., assignor to Tranter Manufacturing, Inc., Lansing, Mich., a corporation of Michigan
Filed Apr. 1, 1968, Ser. No. 717,697
Int. Cl. F24h 3/00; F28b 1/00; F28f 3/14
U.S. Cl. 165—170       2 Claims

ABSTRACT OF THE DISCLOSURE

A plate-type heat transfer unit is comprised of two identical sheet metal stampings mechanically embossed and seam welded flatwise to one another about the periphery thereof, being also welded together in equilaterally polygonal spot welding patterns at certain inner areas. Some of the embossments are of relatively large size and are relatively deeply drawn in locations partially defined by a spot weld pattern; while the remaining embossments are less deeply drawn, extending in zones between successive spot welds of the pattern. They thus complete the lateral definition of a deeper drawn embossment, and also complete a multi-sided communication of each such large embossment with adjacent similar ones. Relatively large intake and exhaust header pipes communicate marginally of the unit with spaces of the latter sided by certain of the deep drawn embossments.

BACKGROUND OF THE INVENTION

Field of the invention

The invention finds application in general to the field of heat transfer and, more especially, in transfer plate units which are immersed in a fluid medium or body to or from which it is desired to effect a heat transfer, for example, through the agency of a change of state type fluid medium. As typically illustrated herein, the unit is generally flat and rectangular, being internally supplied with steam at one margin and having provision adjacent another margin for leading away 100% condensate water. However, the unit may also well find application in refrigeration, circulating internally thereof any well-known cold medium to absorb heat from the body, medium or space in which the unit is disposed.

Description of the prior art

The most pertinent prior art of which I am presently aware is represented by the patent to O. S. McGuffey, No. 2,900,175 of Aug. 18, 1959 (of common ownership), and the United States and foreign patents of record therein. However, none of these deals with a multi-directionally patterned or distributed flow of heat transfer medium, phase change or not, as contemplated by the present improvement.

SUMMARY OF THE INVENTION

The invention involves an improved arrangement of relatively deep-drawn and shallow, transversely registered embossments of a pair of identical die-stamped sheet metal plates, which are seam and spot welded in flatwise facing engagement with one another. The spot welds, located inwardly of marginal seam welding and intake and discharge headers of the plate unit, are at registered plate areas at the ends of the less deeply drawn embossments and, with the latter, represent an equilaterally polygonal (typically hexagonal) definition of a deep drawn embossment which itself is, however, quasi-spherical in shape. The shallower draws are quasi-cylindrical and communicate the flow spaces at the deeper draws with one another; and the scheme of spot welding at ends of the former and apices of the latter affords a maximum of pressure retention in terms of pounds per square inch for a minimum area of the dual plate unit devoted solely to the joining of its plates to one another within their margins.

This in turn signifies that there is a maximum protrusion or projection of the prime heater surfaces on opposite sides of the plate unit into the treated space or medium, for a maximum heat transfer effect. More metal of the composite plate unit is moved transversely outward of its medial plane, generating a decidedly increased effective working area for any given projected area represented by the product of the length and width of the plate unit.

It follows also that in a unit whose main, deep drawn liquid flow volumes or chambers are defined by a number of less deep volumes or zones spaced by connecting spot welds there are multiple available directions of flow in reference to each main chamber, i.e., six in the case of a typical hexagonal spot weld pattern. This allows steam or other phase-change medium to have a maximum capability for two-phase flow. That is, the phase-change medium may flow under pressure, as in steam vapor expansion, in one general directon, with its flow as condensate, or in other phase condition, in a direction generally at a right angle to the pressure flow. The result is that the entire effective embossed plate area is subjected immediately, continuously and substantially uniformly to the most intense heat transfer effect, not just locally at the inlet side of the unit receiving the transfer medium. There is an equality of heat transfer efficiency at any increment of area within the marginal confines of the plate unit.

BRIEF DESCRIPTION OF THE DRAWINGS

FIG. 1 is a fragmentary perspective view giving an indication of the general appearance, within said confines, of one of the like opposite exposed faces of the improved heat transfer plate unit;

FIG. 2 is a fragmentary plan view of a quite schematic nature, being partially broken away and in section adjacent its headers in a plane at the meeting interface of the two composite plates of the unit, this view also indicating by dot-dash arrows and lines the improved two-phase flow of a phase-change transfer medium;

FIG. 3 is a fragmentary view in side elevation of the unit, as from the right of FIG. 2;

FIG. 4 is a fragmentary top plan view of the improved unit, supplementing FIG. 1 in indicating the actual appearance of one of the two like opposite sides thereof; and FIGS. 5 and 6 are, respectively, views in transverse section on lines corresponding to lines 5—5 and 6—6 of FIG. 2.

DESCRIPTION OF A PREFERRED EMBODIMENT

The improved heat transfer unit, generally designated 10, is composed in its entirety of a pair of identical sheet steel stampings or embossed plates 12, 14, which are depicted (FIG. 2) as of rectangular outline. They are generally flat or planar and are flatwise secured face to face with one another in a manner to be described. However, certain installations may well call for an angled or curvilinear plate shape, rather than flat. The reference numeral 16 designates an inlet header or pipe for the heat transfer medium, illustratively to be considered as steam at, say 250 p.s.i., and an outlet header or pipe is designated 18. The headers 16, 18 may typically be lengths of 1½ inch and one inch pipe, respectively, the latter receiving and discharging condensate after a 100% change of phase of the medium.

As specially die stamped identically in the manner to be described, the plates 12 and 14 are marginally seam welded fluid-tight to one another at certain flat edge flanges 19, 20 and 21, the flanges 21 being cut back at 22 (FIG. 2) to receive the condensate discharge pipe 18. This is fitted into and welded to the cut-away zone, being provided with condensate receiving openings 24 at the meeting plane of the two plates 12, 14, which openings communicate with the fluid flow volume of the remainder of plate unit 10 at places of the latter to be described.

Similarly, the steam inlet or supply header pipe 16 is fitted to an adjacent unflanged side of plates 12, 14, the header pipe 16 having openings 25 through which the incoming medium flows under pressure of expansion to the circulating interior of plate unit 10.

In accordance with the principle of the invention, the plates 12 and 14 of unit 10 are initially die stamped in a special manner to afford the two-phase flow of heat transfer medium mentioned above. As indicated above, this may, in a highly desirable and preferred adaptation of unit 10, involve an equilaterally hexagonal patterning of certain spot welds and embossments. This particular geometrical arrangement is only secondarily important; however, it is contemplated that in all cases the weld pattern shall be equilaterally polygonal in nature for a desired uniformity of flow pattern.

Thus, special reference being had to FIGS. 5 and 6, the stamping operation is such as to produce relatively deep drawn, laterally outwardly convex formations or embossments 26 in each of the plates 12 and 14 which are a bit less than hemispherical or quasi-spherical, domed shape in section, these formations defining flow spaces or chambers 27 of major volume centered at the plane 28 of the marginal seam welding of plates 12, 14.

Formations or embossments 30 of the plates are of a quasi-cylindrical shape, also equidistant from seam line 28, afford flow passages 31 which connect and communicate the major flow spaces 27 with one another in a radial way, as illustrated in FIGS. 1 and 4 and, perhaps better in a schematic way, in FIG. 2. Typically, in a unit in which the major embossments 26 are each, say, of 11/16 inch overall draw depth at 90° to the plate meeting plane 28, are of 1 13/16 inch length in the direction of that plane, and are shaped on a radius of 15/16 inch centered to one side of the plane, the minor embossments 30 will each be, for example, of an overall depth of ¼ inch at 90° to the meeting or interface plane and will be cast on a ¼ inch radius centered to one side of the plane.

Each plate is completed by flat circular spot weld areas centered at 32 at the common end of three minor embossments. Areas 32 are, say, of ⅝ inch diameter and are on 1¼ inch centers from one another. They are coplanar with the meeting faces of the respective marginal flanges 19, 20 and 21 of plates 12 and 14, i.e., lie in the interface plane 28. The actual spot weld areas 32 merge with the major embossments 26 and the minor embossments 30 on blending radii at 33 of, say, ⅙ inch. For a typical gauge of sheet metal stock of, for example, 1/16 inch, the inside diameter of the portion of a partsphere defining a major medium circulating space 27 will approximate 1⅞ inches; while the corresponding inside diameter at the minor embossments 30, defining a connecting zone or space 31, will be about ⅜ inch.

It is to be clearly understood, however, that the above-expressed dimensions are by way of illustration only, having been found effective in a stream heating transfer unit 10, hence set forth to enable the invention to be effectively practices. They are subject in practically every respect to variation as circumstances indicate or require.

It is seen that the plate unit 10 affords a maximum protrusion of prime heater surface at the embossments 26 and 30 into the medium to be treated, for a maximum heat transfer effect. Stated otherwise, for a given transversely projected area of plate unit 10, a maximum amount of metal is moved out from the meeting plane 28. Because of the use of multiple small spot welds at 30 there is a minimum area of plates 12, 14 devoted to their union alone; yet the combined or aggregate retentive force is such as to contain high internal steam or other pressure. Manifestly, the union of the plates 12, 14 at these local internal areas might well be effected, if circumstance permitted, by means other than spot welding, such as brazing, riveting, etc.

Moreover, the geometrical arrangement of the spot welds, illustratively in hexagonal patterns, affords a highly efficient control of the flow of heating medium, particularly in a change of phase heat transfer system. Six connecting flow zone passages at 31 communicate with each maximum volume flow chamber 27 within the spot welds. Accordingly, the incoming steam medium may flow under expansive pressure, through the intake header openings 25 (FIG. 2) in a direction generally horizontally crosswise of the plate unit 10, as indicated by the dot-dash, arrow-bearing lines "x"; while upon phase-change or condensation, the flow will be in general at 90° to this direction, or gravitationally to the bottom of unit 10, the 100% condensate exiting, after substantially 100% uniform distribution of steam heating effect over the exposed plate area, through the holes 24 to the discharge pipe or header 18.

Thus, practical considerations in respect to minimum weld area with maximum pressure retention, plus maximum projection or protrusion of prime heater surface into the medium being treated, are coupled with an optimum pattern or distribution of flow.

What is claimed is:

1. A heat transfer unit comprising a pair of sheet metal plates welded face-wise together marginally and internally of the margins thereof, said plates being stamped to provide a plurality of communicating circulating spaces between the plates for a fluid heat transfer medium, said spaces including circulating spaces defined by transversely registered, quasispherical embossments of relatively deep draw on the respective plates, and circulating spaces defined by transversely registered, quasicylindrical embossments of relatively shallow draw on the respective plates, said last named spaces communicating each of said deep draw spaces with others thereof at a plurality of substantially radially opening zones, and a plurality of local areas arranged in an equilaterally hexagonal pattern at the ends of said zones, at which areas said plates are locally spot welded face-wise together within the margins thereof, said shallow draw spaces and said areas of securement laterally defining said deeper draw spaces, and inlet and outlet header means positioned marginally of said plate unit to circulate a heat transfer medium through the spaces adjacent the margins.

2. A heat transfer unit comprising a pair of sheet metal plates welded face-wise together marginally and internally of the margins thereof, said plates being stamped to provide a plurality of communicating circulating spaces between the plates for a fluid heat transfer medium, said spaces including circulating spaces defined by transversely registered embossments of relatively deep draw on the respective plates, and circulating spaces defined by transversely registered embossments of relatively shallow draw on the respective plates, said last named spaces communicating each of said deep draw spaces with others thereof at a plurality of substantially radially opening zones, and a plurality of local areas arranged in an equilaterally polygonal pattern at the ends of said zones, at which areas said plates are locally spot welded face-wise together within the margins thereof, said shallow draw spaces and said areas of securement laterally defining said deeper draw spaces, and means marginal of said plate unit to circulate a heat transfer medium through said spaces, said marginal circulating means comprising a tubular intake header for the transfer medium and a tubular exhaust header, each of said headers being in communication with certain of said deep draw circulating spaces of the unit, said relatively deep draw embossments being quasi-spherical in external shape, said relatively shallow draw embossments being quasi-cylindrical in external shape.

References Cited

UNITED STATES PATENTS 1,838,722  12/1931  Watson _____ 165—175 X
2,354,865   8/1944  Kucher et al, _____ 165—130 X

FOREIGN PATENTS 819,022  6/1937  France.
1,262,662  4/1961  France.

LLOYD L. KING, Primary Examiner
A. W. DAVIS, Assistant Examiner

U.S. Cl. X.R.

62—525; 165—110, 130; 237—73